United States Patent [19]

Blount

[11] 4,083,938

[45] Apr. 11, 1978

[54] PROCESS FOR THE PRODUCTION OF SILICOFORMIC CYANIDE AND SILICOFORMIC DICYANIDE

[76] Inventor: David H. Blount, 5450 Lea St., San Diego, Calif. 92105

[21] Appl. No.: 835,902

[22] Filed: Sep. 23, 1977

Related U.S. Application Data

[63] Continuation-in-part of Ser. No. 757,960, Jan. 10, 1977, abandoned, which is a continuation-in-part of Ser. No. 701,142, Jun. 30, 1976, abandoned.

[51] Int. Cl.$^2$ ............................................. C01B 33/00
[52] U.S. Cl. ...................................... 423/325; 423/365
[58] Field of Search ............... 423/325, 364, 365, 335, 423/326

[56] References Cited

U.S. PATENT DOCUMENTS

| | | |
|---|---|---|
| 3,956,466 | 5/1976 | Blount .................................. 423/325 |
| 3,960,747 | 6/1976 | Blount .............................. 423/325 X |
| 4,022,873 | 5/1977 | Blount .................................. 423/325 |

Primary Examiner—Edward Stern

[57] ABSTRACT

Silocoformic acid is reacted chemically with hydrogen cyanide to produce silicoformic cyanide and silicoformic dicyanide.

2 Claims, No Drawings

PROCESS FOR THE PRODUCTION OF SILICOFORMIC CYANIDE AND SILICOFORMIC DICYANIDE

CROSS-REFERENCE TO RELATED APPLICATIONS

This application is a continuation-in-part of my co-pending U.S. patent application Ser. No. 757,960, filed Jan. 10, 1977, now abandoned which is a continuation-in-part of U.S. patent application Ser. No. 701,142, filed June 30, 1976 now abandoned.

BACKGROUND OF THE INVENTION

This invention relates to a process for the production of silicoformic cyanide and dicyanide by chemically reacting silicoformic acid (H.SiO.OH) with hydrogen cyanide in an aqueous solution and in the ratio of about 1:1 or 1:2 mols.

The silicoformic acid may be produced by the chemical reaction of a dry alkaline earth metal metasilicate or a dry alkali metal metasilicate with a mineral acid or a hydrogen containing acid salt. The silicoformic acid produced is washed with water, filtered and air dried to a granular white powder. Silicoformic acid, also known as monosilanic acid, may also be produced by other methods, such as those disclosed in U.S. Pat. Nos. 3,674,430; 3,929,972; 3,954,941; and 3,962,067.

The silicoformic acid used in the following Examples was produced by reacting dry granular alkali metal metasilicate with an hydrogen containing acid salt or a concentrated mineral acid. The white granules of silicoformic acid were washed with water, filtered, and then air dried at 25° C to 75° C.

The silicoformic acid granules were analyzed by Infrared analysis, using the Infrared KBr disc method. The Infrared analysis showed the presence of Si—H bonds. The Infrared analysis was very similar to that obtained with Mallinckrodt's hydrated silica except for the area which shows the presence of Si—H bonds. The Mallinckrodt's hydrated silica ($SiO_2.xH_2O$) has a molecular weight of 60.09 . $xH_2O$. The silicoformic acid produced contains an active hydrogen which will reduce silver nitrate in an aqueous solution. This is evidence that Si—H bonds are present.

When the silicoformic acid produced is heated much above 105° C, silicon dioxide with a molecular weight of about 60 is produced. On further heating, it has a melting point of 1650° C.

In cryoscopic and ebullioscopic determination, the silicoformic acid produced was not soluble in any common organic solvent but was readily soluble in dulute alkali metal hydroxide aqueous and alcoholic solutions.

The molecular weight was determined from the boiling point elevation of the said silicoformic acid in a 6N sodim hydroxide aqueous solution and indicated a molecular weight of 78 ± 25 gm/mol. This type of reactive solution normally changes the molecular species. The silicoformic acid readily reacts with the sodium hydroxide. However, this would seem to indicate the absence of a polymeric form of silicate. This analysis may indicate a possible formula of $HSi(OH)_3$ (orthosilicoformic acid) and the presence of some $H_2SiO_3$ (metasilicic acid). The orthosilicoformic acid, when dried, will lose water to form silicoformic acid.

The cyanide silicate silicoformic acid cyanide ($H_3SiO_2CN$) and dicyanide silicate silicoformic acid dicyanide $H_2SiO_2(CN)_2$, compounds are useful as an intermediate in the production of many organic silicates compounds, such as amine silicates, isocyanate silicates, organic silicate acids, organic ester silicates and other organic silicate compounds. The cyanide silicate and dicyanide silicate compounds are useful as fillers in varnishes and paints.

As an example of the utilization of cyanide silicate and dicyanide silicate compounds the following example is given; about 1 part by weight of the mixture of cyanide silicate and dicyanide silicate as produced by this process are mixed with 1 part by weight of diethylenetriamine and 2 parts by weight of epichlorohydrin. The epichlorohydrin is slowly added while agitating and keeping the temperature between 25° to 70° C at ambient pressure and agitating for 20 to 45 minutes thereby producing an epoxy resinous product, a thick liquid. The resin is poured into molds of useful objects such as gears, knobs, etc., then heated to 80° to 100° C thereby producing hard, tough, useful objects.

As another example of utilization of dicyanide silicate the following example is given: about 1 part by weight dicyanide silicate, 0.1 part by weight of sodium carbonate, and 2 parts by weight of methacrylic acid are mixed in 4 parts by weight of water then 0.01 parts by weight of potassium persulfate and 0.001 parts by weight of ferric sulfate are added. The mixture is then heated to about 50° to 80° C for 20 to 60 minutes thereby producing a resinous solid product. The resinous solid product is ground into powder then molded by heat and pressure into useful objects such as knobs, art objects, toys, etc.

DETAILED DESCRIPTION OF THE INVENTION

While details of the mechanism of the reactions which I obtain are not fully understood, it is thought that the basic reaction takes place as follows:

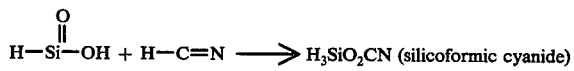
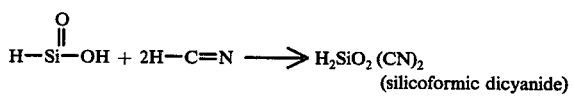

The reactions discussed above may be conducted under any suitable physical condition. While the reactants may be mixed in any suitable proportions, generally approximately stoichiometric proportions are preferred. Thus the formation of silicoformic cyanide will ordinarily require about 1 mol each of silicoformic acid and hydrogen cyanide, but some silicoformic dicyanide is also produced with the 1 to 1 ratio. To produce silicoformic dicyanide, a ratio of one mol of silicoformic acid to two mols of hydrogen cyanide is used.

While the reactants may be brought into contact in any suitable manner, mixing in an aqueous solution is generally preferred. The raction may be conducted at any suitable temperature.

An alkali catalyst is not necessary for the reaction but appears to enhance the reaction to produce silicoformic cyanides. Any alkali metal hydroxide or carbonate, sodium silicate potassium silicate, alkali cyanates and other alkaki compounds may be used as the catalyst. The concentration of the alkali may vary from 1 to 10% by weight of the reactants, silicoformic acid and hydrogen cyanide. The alkali metal hydroxide catalyst will react chemically with silicoformic acid. Sodium carbonate is the preferred alkali catalyst.

The silicoformic cyanide produced by this method is a light brown, granular compound, when in a solution having a pH above 7, and is a blue granular compound when the pH is below 6. It is soluble in acetic acid.

DESCRIPTION OF PREFERRED EMBODIMENTS

My invention will be illustrated in greater detail in the following Examples which describe various preferred embodiments of the process of this invention. These Examples are merely illustrative of novel processes and do not limit the procedures which may be used in the production of my novel silicoformic cyanide compounds. Parts and percentages are by weight unless otherwise indicated.

EXAMPLE I

About 60 parts by weight of silicoformic acid produced by the method in U.S. Pat. No. 3,956,466, and about 50 parts by weight of potassium cyanide are added to about 200 parts by weight of water. Dilute hydrochloric acid is slowly added to the mixture until the pH is about 6 to 7, while agitating. The reaction is completed in a few minutes, thereby producing blue granules of silicoformic cyanide and a small amount of brown granules of silicoformic dicyanide. The silicoformic cyanide and silicoformic dicyanide are recovered by filtering off the water and salt.

EXAMPLE II

About 60 parts by weight of silicoformic acid, about 100 parts by weight of sodium cyanide and about 200 parts by weight of water are mixed, then dilute sulfuric acid is slowly added while agitating and keeping the temperature below 50° C, until the pH is about 7 to 8, thereby producing light brown granules of silicoformic dicyanide and lesser amounts of brown granules of silicoformic cyanide. The water and sodium sulfate are filtered off, thereby recovering the silicoformic dicyanide and cyanide.

EXAMPLE III

About 60 parts by weight of granular silicoformic acid, about 5 parts by weight of a catalyst, sodium carbonate, and about 50 parts by weight of hydrogen cyanide are mixed in about 300 parts by weight of water. The temperature is kept below 25° C and the mixture is agitated at ambient pressure for about 90 minutes until the chemical reaction is complete, thereby producing brown granules of silicoformic cyanide and a lesser amount of brown granules of silicoformic dicyanide. The water and sodium carbonate are filtered off, thereby recovering the silicoformic cyanide and dicyanide.

EXAMPLE IV

Hydrogen cyanide is passed through about 100 parts by weight of silicoformic acid which has been moistened with an aqueous solution containing enough sodium carbonate to give a pH of 8 to 10. A closed system is used and the unused hydrogen cyanide is recycled. The temperature is kept just above the boiling point of hydrogen cyanide and ambient pressure is used. The chemical reaction is complete in about 1 to 2 hours, thereby producing brown granules of silicoformic dicyanide and a small amount of brown silicoformic cyanide granules.

EXAMPLE V

About 30 parts by weight of silicoformic acid, about 30 parts by weight of hydrogen cyanide and about 5 parts by weight of sodium cyanide are added to about 300 parts by weight of water. The mixture is agitated at ambient temperature and pressure for about 60 minutes, thereby producing brown granules of silicoformic dicyanide and brown granules of silicoformic cyanide.

Dilute sulfuric acid is added until the pH of the solution is about 4 to 5. The brown granules of silicoformic dicyanide go into solution and the brown granules of silicoformic cyanide do not. The brown granules of silicoformic cyanide turn blue. The silicoformic dicyanide is filtered off, thereby recovering the blue silicoformic cyanide.

the brown solution of silicoformic dicyanide is neutralized with sodium carbonate unitl the pH is about 7, and a light tan precipitate of silicoformic dicyanide is recovered. The water and sodium sulfate are removed by filtration. the silicoformic dicyanide is soluble in acetic acid.

EXAMPLE VI

Hydrogen cyanide gas is passed through about 100 parts by weight of granular silicoformic acid which contains about 3 parts by weight of an alkali catalyst, barium cyanide, in a closed system at ambient pressure. The temperature is kept above the boiling point of hydrogen cyanide for at least about 1 to 2 hours, until the chemical reaction is complete, thereby producing silicoformic dicyanide and silicoformic cyanide. The unreacted hydrogen cyanide may be recycled.

EXAMPLE VII

About 60 parts by weight of silicoformic acid and about 100 parts by weight of sodium cyanide are mixed, and about 200% water is added by weight. The mixture is heated to about 120° C until the water has evaporated, producing dark brown granules of disodium silicoformic dicyanide $(Na_2)SiO_2(CN)_2$ and sodium silicoformic cyanide $(NaHSiO_2CN)$. About 200% water by weight is added; disodium silicoformic dicyanide goes into solution, and the sodium silicoformic cyanide remains as light brown granules. The solution of disodium silicoformic dicyanide is filtered off, and the water is evaporated, leaving the disodium silicoformic dicyanide.

Dilute hydrochloric acid is added to the tan granules of sodium silicoformic cyanide until the pH is about 6, thereby producing blue granules of silicoformic cyanide. The blue granules of silicoformic cyanide are soluble in acetic acid.

Dilute hydrochloric acid is slowly added to the solution of disodium silicoformic dicyanide until the pH is about 7, thereby precipitating light brown silicoformic dicyanide.

EXAMPLE VIII

About 60 parts by weight of dry granular silicoformic acid, about 2 parts by weight of a catalyst, potassium cyanide and about 10 parts by weight of water are mixed. About 60 parts by weight of hydrogen cyanide are slowly added to said mixture while agitating at ambient temperature and pressure for 60 to 100 minutes until the reaction is complete. The water and potassium cyanide are filtered off, thereby recovering the brown granules of silicoformic cyanide and silicoformic dicyanide.

To separate the granules of silicoformic dicyanide and silicoformic cyanide, about 100 parts by weight of 3N sulfuric acid is added. The mixture is agitated for 10 to 20 minutes, and the silicoformic dicyanide goes into solution and the granules of silicoformic cyanide turn blue. The aqueous solution of silicoformic dicyanide is filtered off, thereby recovering the silicoformic cyanide. The blue silicoformic cyanide granules are then washed with a dilute sodium carbonate solution until the pH is about 7, thereby recovering brown granules of silicoformic cyanide.

The aqueous sulfuric acid solution containing silicoformic dicyanide is then neutralized with an alkali such as sodium carbonate, potassium carbonate, potassium hydroxide, and sodium hydroxide until the pH is about 6 to 8, thereby precipitating soft brown particles of silicoformic dicyanide. The water and alkali metal salt are filtered off.

EXAMPLE IX

The method to produce silicoformic cyanide ($H_3SiO_2CN$) and silicoformic dicyanide $H_2SiO_2(CN)_2$ by the following steps:
(a) adding about 60 parts by weight of granular silicoformic acid to about 10 to 600 parts by weight of water;
(b) adding about 2 to 10 parts by weight of an alkali compound, selected from the group consisting of sodium carbonate, sodium cyanide, potassium cyanide and barium cyanide;
(c) adding hydrogen cyanide slowly to said mixture while agitating for 60 to 100 minutes at ambient temperature and pressure until 50 to 60 parts by weight have been added, thereby
(d) producing brown granules of silicoformic cyanide and silicoformic dicyanide.
(e) adding dilute sulfuric acid to the silicoformic cyanide and silicoformic dicyanide until the pH is about 4 to 5 while agitating for 10 to 20 minutes, and the silicoformic dicyanide goes into solution:
(f) filtering off the solution of silicoformic dicyanide and recovering blue granules of silicoformic cyanide,
(g) adding an alkali metal carbonate or hydroxide, selected from the group consisting of sodium carbonate, sodium hydroxide, potassium carbonate and potassium hydroxide, until the pH is about 6 to 8, thereby precipitating light brown silicoformic dicyanide,
(h) filtering off the water and alkali metal salt, thereby recovering silicoformic dicyanide;
(i) washing the blue granules of silicoformic cyanide with a dilute alkali metal carbonate (sodium carbonate) solution until the pH is about 6, then
(j) filtering off water and alkali metal salts;
(k) recovering the brown granules of silicoformic cyanide.

EXAMPLE X

The method to produce silicoformic cyanide ($H_3SiO_2CN$) and silicoformic dicyanide $H_2SiO_2(CN)_2$ by the following steps:
(a) adding about 60 parts by weight of granular silicoformic acid to about 10 parts by weight of water;
(b) adding 2 parts by weight of sodium cyanide:
(c) adding hydrogen cyanide slowly to said mixture while agitating for 60 to 100 minutes at ambient temperature and pressure until 50 parts by weight have been added, thereby
(d) producing brown granules of silicoformic cyanide and silicoformic dicyanide.
(e) adding dilute sulfuric acid to the silicoformic cyanide and silicoformic dicyanide until the pH is about 4 to 5 while agitating for 10 to 20 minutes, and the slicoformic dicyanide goes into solution;
(f) Filtering off the solution of silicoformic dicyanide and recovering blue granules of silicoformic cyanide;
(g) adding sodium carbonate until the pH is about 6 to 8, thereby precipitating light brown silicoformic dicyanide;
(h) filtering off the water and alkali metal salt, thereby recovering silicoformic dicyanide;
(i) washing the blue granules of silicoformic cyanide with a dilute alkali metal carbonate (potassium carbonate) solution until the pH is about 7, then
(j) filtering off water and alkali metal salts;
(k) recovering the brown granules of silicoformic cyanide.

EXAMPLE XI

The method to produce silicoformic cyanide ($H_3SiO_2CN$) and silicoformic dicyanide $H_2SiO_2(CN)_2$ by the following steps:
(a) adding about 60 parts by weight of granular silicoformic acid to about 600 parts by weight of water;
(b) adding about 10 parts by weight of potassium cyanide;
(c) adding hydrogen cyanide slowly to said mixture while agitating for 60 to 100 minutes at ambient temperature and pressure until 60 parts by weight of water have been added, thereby
(d) producing brown granules of silicoformic cyanide and silicoformic dicyanide;
(e) adding dilute sulfuric acid to the silicoformic cyanide and silicoformic dicyanide until the pH is about 4 to 5 while agitating for 10 to 20 minutes, and the silicoformic dicyanide goes into solution;
(f) filtering off the solution of silicoformic dicyanide and recovering blue granules of silicoformic cyanide; (g) add potassium hydroxide until the pH is about 6 to 8, thereby precipitating light brown silicoformic dicyanide;
(h) filtering off the water and alkali metal salt, thereby recovering silicoformic dicyanide;
(i) washing the blue granules of silicoformic cyanide with a dilute alkali metal carbonate (sodium carbonate) solution until the pH is about 7, then
(j) filtering off water and alkali metal salts;
(k) recovering the brown granules of silicoformic cyanide.

While specific proportions, ingredients and conditions were detailed in the above Examples, these may be varied within the scope of these disclosures with similar results. For example, catalysts or other agents may be utilized to enhance or modify these reactions. Other ramifications, applications and variations of the invention will occur to those skilled in the art upon reading this disclosure. These are intended to be included within the scope of this invention as defined in the appended claims.

I claim:

1. The method of producing silicoformic cyanide ($h_3SiO_2CN$) and silicoformic dicyanide $H_2SiO_2(CN)_2$ by the following steps:
    (a) adding about 60 parts by weight of granular silicoformic acid to about 10 to 600 parts by weight of water;
    (b) adding about 2 to 10 parts by weight of an alkali catalyst selected from the group consisting of sodium carbonate, sodium cyanide, potassium cyanide and barium cyanide;
    (c) adding hydrogen cyanide slowly to said mixture while agitating for 60 to 100 minutes at ambient temperature and pressure until 50 to 60 parts by weight have been added, thereby
    (d) producing brown granules of silicoformic cyanide and silicoformic dicyanide.

2. The method of claim 1 wherein additional steps are added:
    (a) dilute sulfuric acid is added to the brown granules of silicoformic cyanide and silicoformic dicyanide until the pH is about 4 to 5 while agitating for 10 to 20 minutes, and the silicoformic dicyanide goes into solution;
    (b) filtering off the solution of silicoformic dicyanide and recovering granules of silicoformic cyanide, which are blue in color,
    (c) adding an alkali metal carbonate or hydroxide selected from the group consisting of sodium carbonate, sodium hydroxide, potassium carbonate and potassium hydroxide, to the solution of silicoformic dicyanide until the pH is about 6 to 8, thereby precipitating light brown silicoformic dicyanide;
    (d) filtering off the water and alkali metal salt, thereby
    (e) recovering silicoformic dicyanide;
    (f) washing the granules of silicoformic cyanide with dilute sodium carbonate solution until the pH is about 7, then
    (g) filtering off the water and alkali metal salts, thereby
    (h) recovering the brown granules of silicoformic cyanide.

\* \* \* \* \*